US006218898B1

United States Patent
Zanetti

(10) Patent No.: US 6,218,898 B1
(45) Date of Patent: Apr. 17, 2001

(54) CIRCUITRY FOR MEASURING PIEZOELECTRIC SIGNALS

(75) Inventor: Markus Zanetti, Frauenfeld (CH)

(73) Assignee: K.K. Holding AG, Winterthur (CH)

( * ) Notice: Subject to any disclaimer, the term of this patent is extended or adjusted under 35 U.S.C. 154(b) by 0 days.

(21) Appl. No.: 09/305,119

(22) Filed: May 4, 1999

(30) Foreign Application Priority Data

May 19, 1998 (CH) .................................................. 1099/98

(51) Int. Cl.[7] .............................. H03F 1/00; H01L 41/04
(52) U.S. Cl. ......................................... 330/174; 310/311
(58) Field of Search ................... 330/9; 4/174; 327/124; 310/314, 311, 319, 320, 326, 338

(56) References Cited

U.S. PATENT DOCUMENTS

| 4,009,447 | 2/1977 | Wolf et al. ........................... 330/110 |
|---|---|---|
| 4,543,536 | 9/1985 | Pederson ................................. 330/85 |
| 4,760,345 | 7/1988 | Büsser et al. ............................. 330/9 |
| 5,252,928 | 10/1993 | Giorgetta ................................ 330/51 |
| 5,523,642 | 6/1996 | Hashimoto et al. .................. 310/319 |
| 5,857,463 | * 1/1999 | Thurston et al. .................... 128/659 |
| 6,046,632 | * 4/2000 | Straw ....................................... 330/2 |

* cited by examiner

*Primary Examiner*—Robert Pascal
*Assistant Examiner*—Khanh Van Nguyen
(74) *Attorney, Agent, or Firm*—Barnes & Thornburg

(57) ABSTRACT

A circuitry for measuring piezoelectric signals for a piezotransducer/charge amplifier combination with a range capacitor including a voltage divider with a switch element providing a feedback signal to the measuring input of a charge amplifier. The switching element is controlled by a pulse generator for zeroing. The range capacitors charge to a certain class and voltage at the commencement of the measuring. An adjustment of the range of the range capacitor is provided by a second voltage divider.

13 Claims, 5 Drawing Sheets

CIRCUITRY FOR MEASURING PIEZOELECTRIC SIGNALS

BACKGROUND AND SUMMARY OF THE INVENTION

The invention relates to a circuitry for measuring piezoelectric signals and more specifically to a circuitry which allows adjustment of the range. As such, it is known from Swiss Patent 542.434. Corresponding to U.S. Pat. No. 4,009,447. With this known circuitry, the range or feedback capacitance is fully discharged when resetting, so that before a renewed switch-on of the power for a fresh measurement, there is no voltage on this capacitance and this process is consequently called zeroing. The disadvantage of this zeroing of the range capacitor is that measurements can be made only in one range determined by its capacitance, as will be explained later.

The purpose of the invention is to achieve a circuitry with a measuring range adjustable within certain limits, freed from direct linkage to the capacitance of the range capacitor. This aim is attained by the features characterized in of this invention.

By means of the voltage divider, after switching on the power, i.e. upon breaking the reset short circuit of the two-wire line, an output quiescent voltage, depending on the voltage divider selected, is built up to a level that determines the measuring range to be covered. This voltage build-up is produced by a pulse of defined duration closing the switching element for this defined time interval when the power is switched on. This causes a control loop to charge the range capacitor to a defined voltage. The reference voltage at one input of the amplifier serves at setpoint, while as actual value the output voltage over the voltage divider and the switching element at the other end of the amplifier is brought into line with the reference voltage. At the end of the defined time interval, the circuit is ready for measuring.

If the actual value is too big for the control system as just described, the output voltage must be lowered. The current passing during this is led off via the input components, causing these to heat up, leading to increased drift. To minimize this heating, a control element regulated by the amplifier, for example a variable transistor, may be shunted with the voltage divider which serves to determine the output quiescent voltage. Via this transistor the rest of the supply current can be led off past the input components.

The time constant of the circuit, and with it the lower cutoff frequency, may be adjusted within certain limits by selecting a suitable time constant resistor of Rg rating, allowing for example switchover between operation with relatively short time constant and a long operating state with a time constant as long as possible. In the short mode, with a given range capacitance Cg, the time constant is determined essentially by the rating Rg of the time constant resistor. In long mode, the resistance of the open switching element is determined essentially by the time constant. Switching on or over to one of the two operating modes can be effected with the new circuitry if the pulse generator controls an asymmetrical bistable trigger element in addition. The particular final state of the trigger element, which is determined by a direct, steep or a delayed, relatively flat rise of the switch-on pulse, defines the time constant of the circuit. Moreover a unidirection of element, such as a diode prevents self-control of the final state of the trigger element determined by the steep rise.

If a relatively long time constant, exceeding 1 second for example, is required for the circuit in short mode operation too, resulting in a relatively slow reset, i.e. relatively slow charging of the range capacitor to the output quiescent voltage, for speedy reset, a further switching element likewise controlled by the pulse generator may bridge the time constant resistor. The mode in which the circuit is being operated can be seen if the voltage divider determining the output quiescent voltage is preceded by a shortable resistor whose short circuiting is controlled by the trigger element. The output quiescent voltage is altered by switching-in or shorting this resistor.

A zero offset, due to a drift current in the time constant resistor, can be corrected by shunting this with an analog integrator or comparator. The drift current then no longer passes through the time constant resistor but is led off via the analog integrator or comparator.

For a given range capacitor, the measuring range can be optimized for the proposed application by feeding the range capacitor back through a second voltage divider. The measuring signal input of the amplifier is preceded by a low-pass filter which serves to compensate any frequency response change caused by adjusting the measuring range with the second voltage divider.

If the piezoelectric element of the piezotransducer is fitted in the transducer housing insulated against earth and placed between both amplifier inputs, the drift in the piezotransducer/ amplifier combination can be kept low, because the voltage on the piezoelectric element is low or zero.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
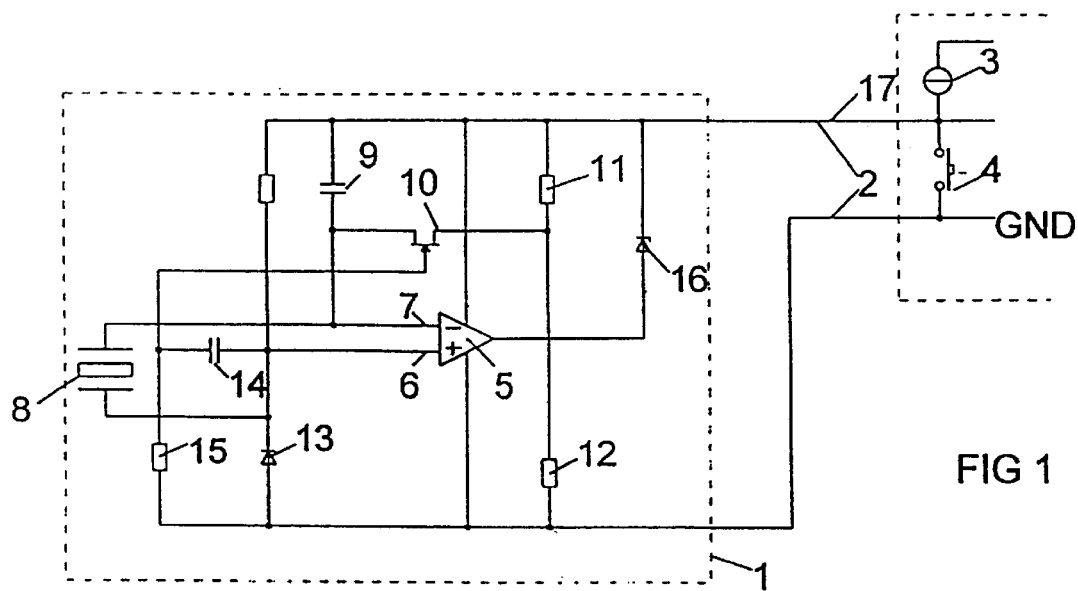
FIG. 1 shows a schematic diagram of the circuit according to the principles of the present invention.

The piezotransducer/charge amplifier combination 1, shown in FIGS. 1 to 6 framed with broken lines, is linked via a two-wire line 2 with an evaluation and power supply unit not shown in full, which includes a constant current source 3 and a short-circuiting switch 4 for the two-wire line 2, which is opened to switch on the circuitry.

In familiar manner, the output of the charge amplifier 5 between whose inputs 6 and 7 the piezoelectric measuring element 8 is arranged, e.g. a quartz crystal, is fed back via a range capacitor 9 with capacitance Cg. The capacitor 9 is used not short-circuited for zeroing directly via a switching element 10 in the known manner, but according to the invention is led back via the switching element 10 and a voltage divider 11, 12 to the input 7 of the amplifier 5 which accepts the measuring signal. The other input 6 of amplifier 5 is held at a defined reference voltage by a constant voltage source 13.

The switching element 10, which like the other switching elements employed in the application may be familiar like a relay, a microswitch, a heat- or light-controlled switch, or else an FET as in the examples shown, is controlled by a pulse generator with defined fall time. In the examples the pulse generator a correspondingly dimensioned RC element 14, 15, though it could also be a monostable trigger element for instance. What is also possible, though not shown, is to shunt the reference voltage source 13 in parallel with a voltage divider and take the reference voltage for the amplifier input 6 from this. Furthermore with a diode, not shown, paralleling resistor 15, it is possible to obtain faster discharge of the capacitor 14 with the two-wire line 2 short-circuited.

Finally the amplifier output is decoupled from output 17 by another diode 16.

The mode of operation of the circuitry shown in the basic diagram will now be described briefly:

When the circuitry is switched on, the reference voltage builds up on the reference diode 13 acting as constant voltage source. After the capacitor 14 generates a pulse which dies away over the resistor 15. This pulse controls the switching element 10, which closes a control loop. This loop has as a setpoint the reference voltage at input 6 of amplifier 5. The actual value of the control loop is the voltage at the amplifier input 7 taking the measuring signals. The actual value is derived from the output voltage, which is fed back via the voltage divider 11, 12 and the closed switching element 10. During the time when the switching element 10 is controlled closed and the control system is active, the range capacitor 9 is charged to a defined voltage.

If the actual value 7 is smaller than the setpoint at 6, the voltage at output 17 increases and with it the actual value at input 7 also. If the actual value at 7 exceeds the setpoint at 6, the voltage at output 17 drops and with it the actual value at input 7 too.

Figure 2:
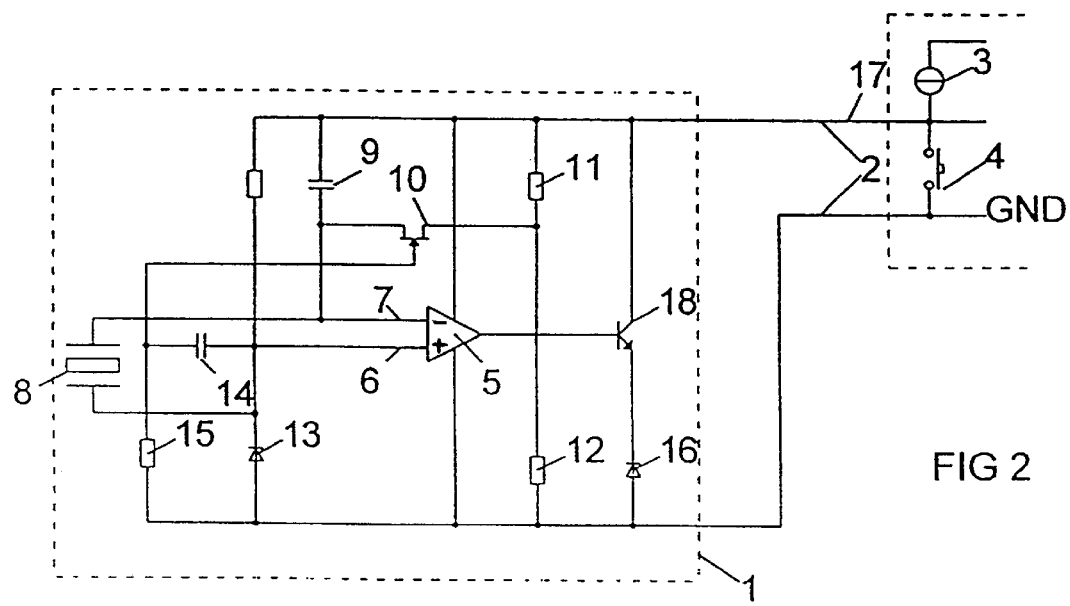
FIG. 2 shows a circuitry in which the remaining power current is led off via a regulated control element according to the principles of the present invention.

The control action is completed when the actual value and setpoint are equal. After the pulse dies away over the resistor 15, the switching element 10 is opened so that the control loop is interrupted. The circuitry is now ready to measure piezoelectric signals. FIG. 2 differs from FIG. 1 only in that the output of amplifier 5 is not directly connected to output 17 via diode 16 but via a controllable transistor 18.

If the actual value of the control loop is too low, the amplifier 5 controls transistor 18 so that it blocks, causing the voltage to rise at output 17 and with it the actual value.

If the actual value is too high, the amplifier 5 controls the transistor 18 so that this becomes conductive, the transistor 18 is controlled according to the excessive output voltage at 17 so that part of this voltage is reduced by a current passing over it, reducing the output voltage and with it the actual value at 7. In this way, the current flows away from the input components, avoiding these from becoming heated.

Figure 3:
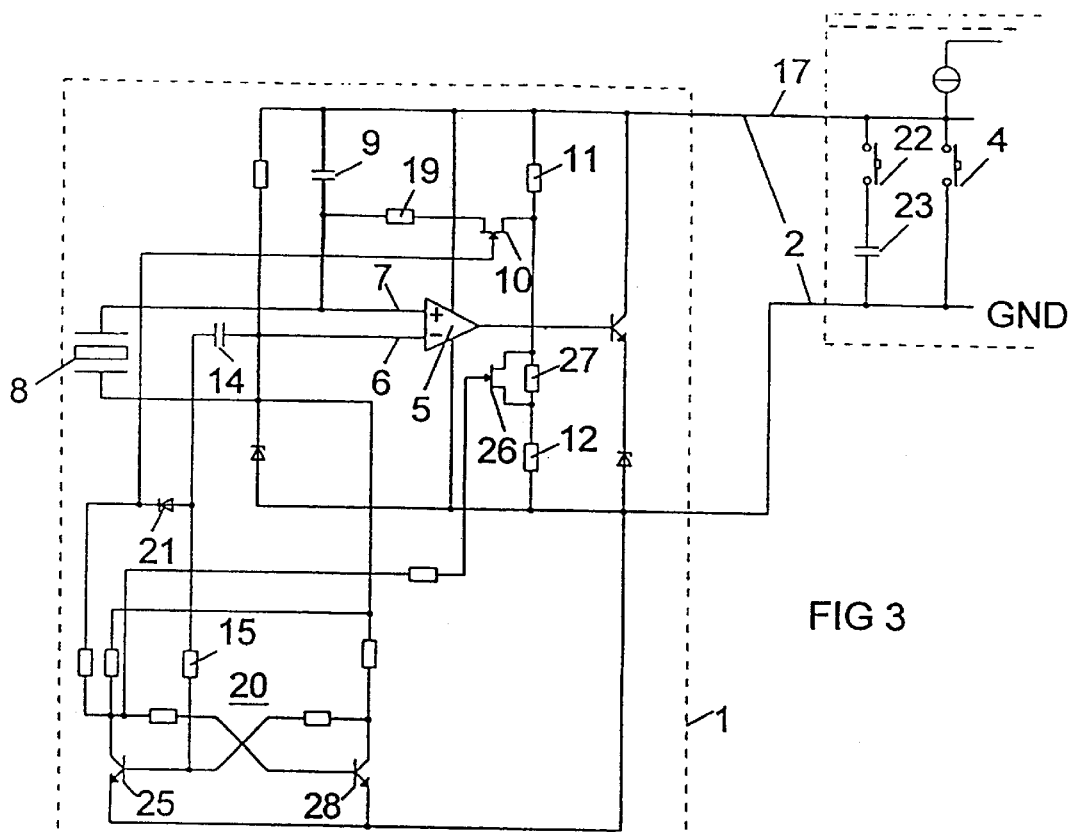
FIGS. 3 and 4 show a circuitry in which time constant switchover is provided by means of a bistable trigger element with a display of the selected operating mode according to the principles of the present invention.
Figure 4:
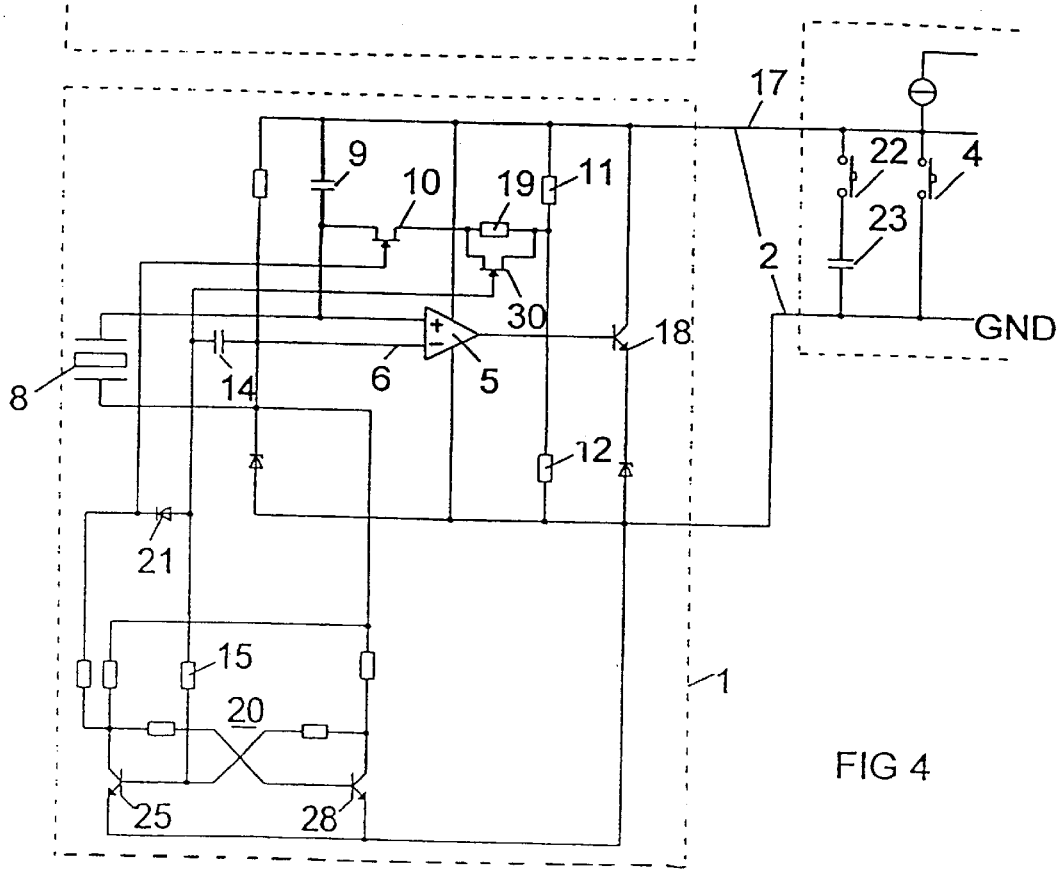

In FIGS. 3 and 4 the circuitry is enlarged by a time constant resistor 19 of Rg rating and by an asymmetrical bistable trigger element 20, which is likewise controlled by the pulse generator 14, 15. Self-control of the trigger element in one of its final states is prevented by a one-way element such as a diode 21.

The trigger element 20 provides switchover between short and long operating modes. The time constant in short operation is determined essentially by the rating of the time constant resistor 19 with a given range capacitor 9. The long mode the time constant is given essentially by the resistance of the open switching element 10. The shape of the switch-on pulse decides the final state of the trigger element 20. If the switch-on pulse passes directly into the trigger element 20, i.e. with a steep slope and an inactive delay in the evaluation and power supply unit consisting of a switch 22 and a capacitor 23 in the examples here, the circuitry then operates in the long mode. A steep switch-on pulse causes a pulse on the transistor 25 of trigger element 20 via the pulse generator 14, 15, making it conductive and ensuring the open position on the switching element 10 after the switch-on pulse dies away. At the same time, the conductive transistor 25 causes a switching element 26 (FIG. 3), able to short-circuit an additional resistor 27 in the voltage divider 11, 12, to stay open, so that an output quiescent voltage characteristic for the long operating mode occurs.

If the circuitry is switched on owing to the activated delay 22, 23 in the evaluation and power supply unit with slowly rising slope, the pulse emitted by the pulse generator 14, 15 is not able to put the transistor 25 into its conductive state. Due to the asymmetry of the trigger element 20 the transistor 28 is conductive in the other stable final state. This causes firstly that the switching element 10 remains conductive even after the switch-on pulse dies away, secondly that switching element 26 short-circuits the resistor 27. Through this short-circuiting a predetermined output quiescent voltage for the short mode is established. With switching element 10 controlled closed, the time constant is determined essentially by the rating Rg of the time constant resistor 19. As already explained, the circuitry is then operational in the short mode.

With relatively small time constant resistors 19, whereby time constants up to about 1 second are reached, a reset time determined by the resistor 19 is acceptable. It amounts to about 6 times the time constant. For longer time constants, the reset times should be shortened. This may be accomplished with a further switching element 30, likewise controlled by the pulse generator 14, 15 in the same manner as switching element 10 in the long or short mode. With this switching element 30 the time constant resistor 19 is short circuited during reset, i.e. while the range capacitor is being charged.

Figure 5:
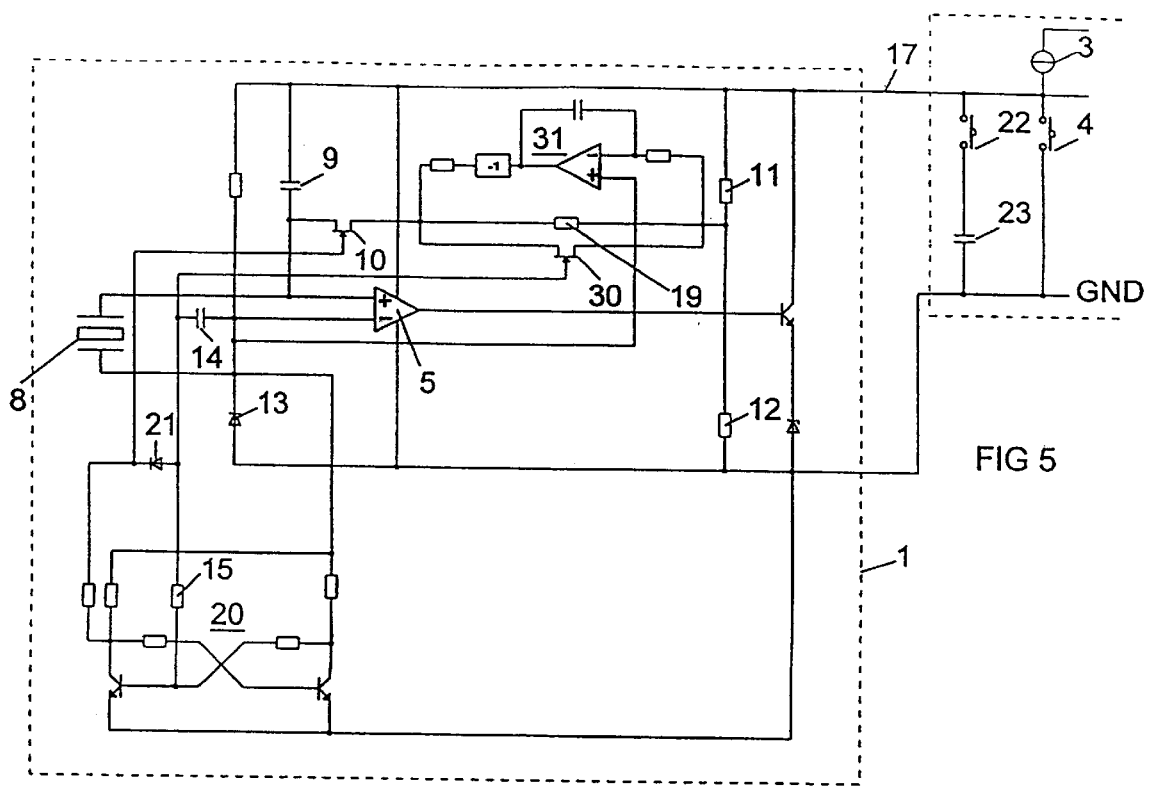
FIG. 5 shows a circuitry with an additional integrator shunting the time constant resistor according to the principles of the present invention.
Figure 8:
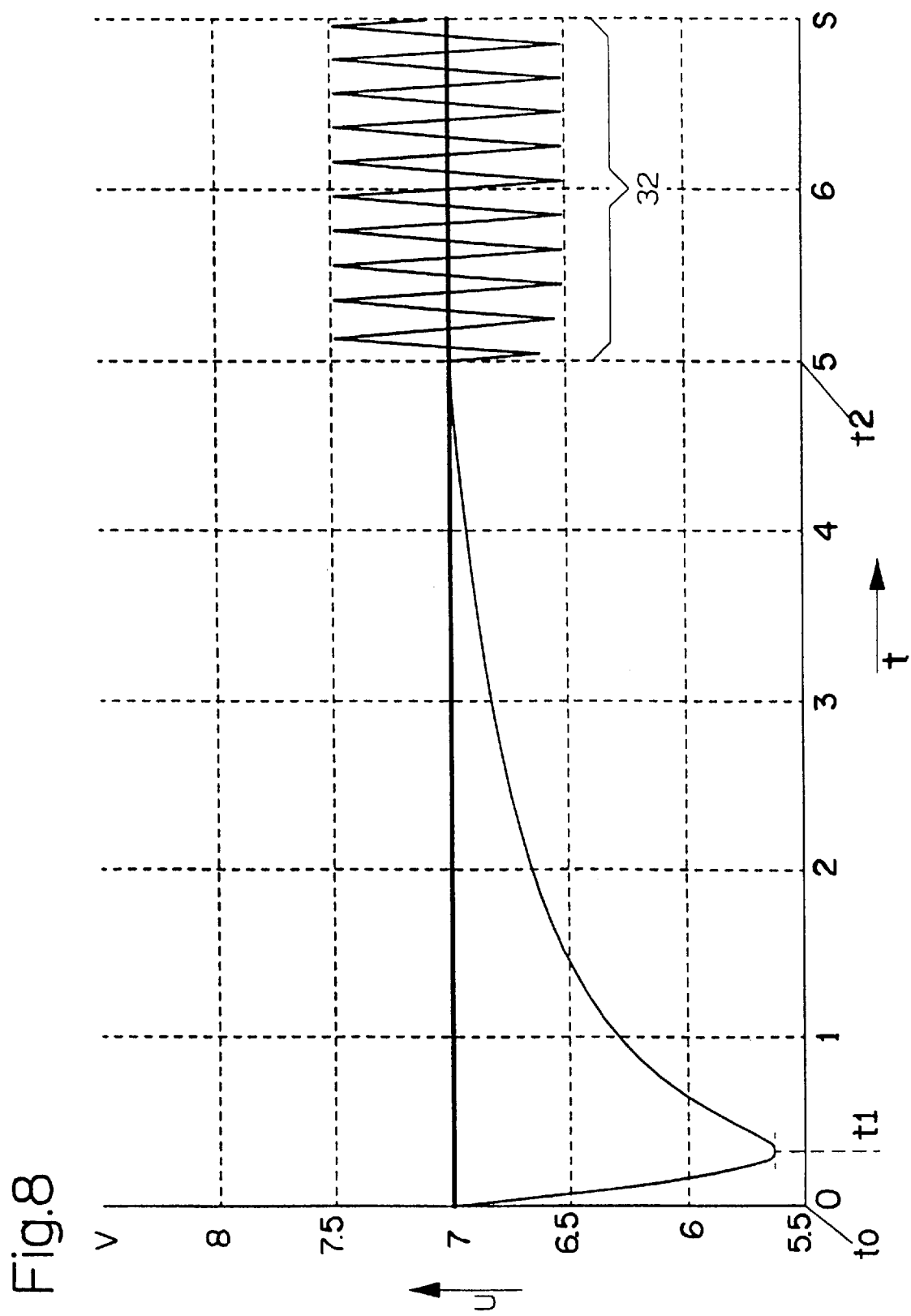
FIG. 8 shows a graph of the compensation of the working point offset with the help of an integrator.

The circuitry shown in FIG. 5 has the time constant resistor 19 in parallel to an analog integrator 31. As shown in FIG. 8, this assures a drift current correction where there is working point offset at the output of amplifier 5 due to a drift current through the time constant resistor. In FIG. 8 the time in seconds is the abscissa and the voltage at output 17 is the ordinate. When the circuitry is switched on by opening the switch 4 in the evaluation unit at time t0, owing to the drift mentioned, the voltage at output 17 shifts towards zero, reaching its minimal final value at the time t1. By the integrator 31, which may also be substituted by a comparator, this voltage is slowly reduced so that by time t2 the working point drift is corrected and measuring may commence. In FIG. 8 measuring signals are shown schematically at 32.

Figure 6:
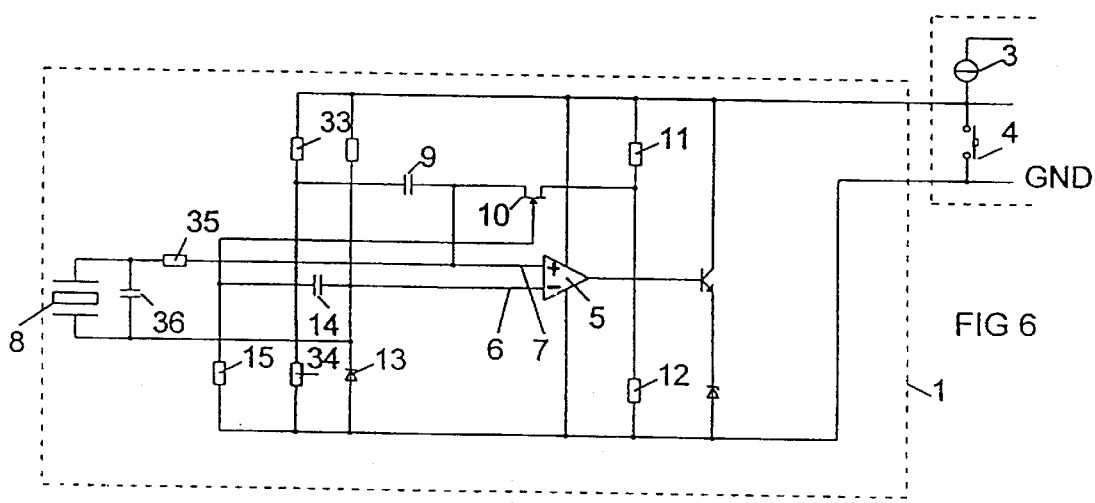
FIG. 6 shows a circuit with a second voltage divider for adjusting the measuring range, with a low-pass filter according to the principles of the present invention.

The circuitry according to FIG. 6, which has been simplified compared with the previous figures to make things clearer, has a second voltage divider 33, 34, through which the range capacitor 9 is fed back. Depending on the resistance ratio chosen, this voltage divider 33, 34 enables more sensitive measuring ranges to be fixed, compared with the maximum range determined by the capacitance Cg and voltage divider 11, 12, without altering the values of capacitance Cg and voltage divider 11, 12. This allows the circuitry to be adapted optimally to the measured.

This kind of measuring range adjustment involves a change of frequency response, which is compensated by a low-pass filter 35, 36 before this amplifier input 7.

The effect of the invention will now be explained with reference to FIG. 7 for an arbitrary dimensioning of the circuit components. The quiescent voltage over the range capacitor 9 after reset is plotted on the abscissa, and the relevant charge measuring range in nanocoulombs (nC) on the ordinate. U(Cg) represents the voltage on the range capacitor 9, i.e. its voltage after the switch-on pulse dies away immediately before measuring commences. The voltage U1(Cg) is the maximum difference between the output quiescent voltage U(A) of the circuit and the reference voltage U(R) at output 6 of amplifier 5, because both voltage inputs 6 and 7 are adjusted to the same voltage value. The possible overall range of this voltage U(Cg) extends over the entire output quiescent voltage U(A).

Figure 7:
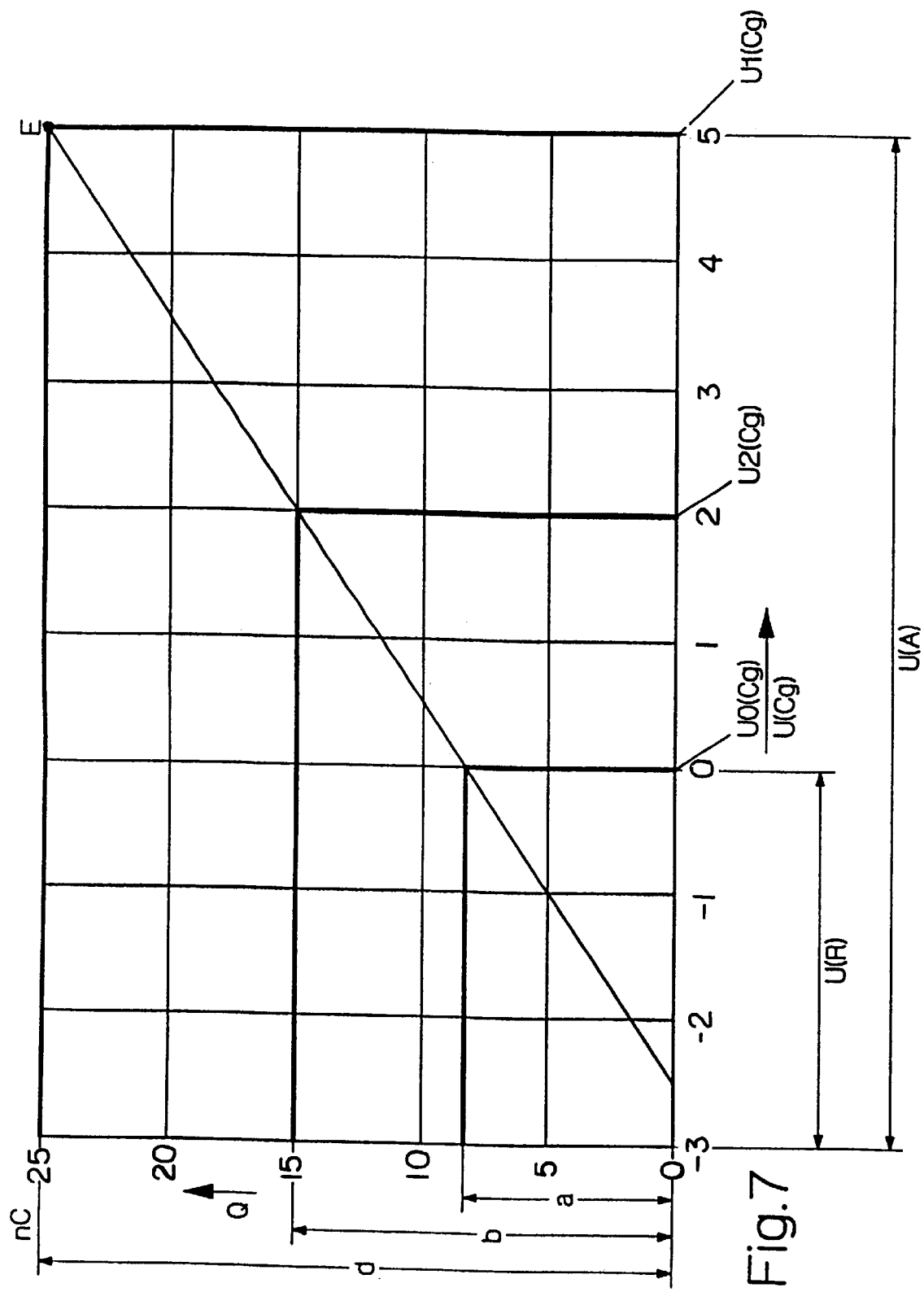
FIG. 7 shows a is a graph of possible measuring ranges with the voltage divider versus the measuring range adjustment, whilst retaining the measuring range capacitance.

The maximum voltage on capacitor 9 at the commencement of measuring is allocated to a maximum measuring range d for the charge Q to be measured, which extends over the entire height of the ordinate in FIG. 7.

From the end point E of this measuring range, i.e. its maximum, at maximum voltage U1(Cg), the possible measuring range for a charge Q to be measured is obtained in the graph by allocating this charge to the particular value of U(Cg) using the straight line from E over the entire possible range for U(Cg), i.e. over the entire abscissa length for the output quiescent voltage U(A). A measuring range suitable for a particular purpose for charge Q or the voltage U(Cg) needed for this can be selected with the help of the voltage divider 33, 34.

From FIG. 7 it may therefore be seen that with circuitry according to the state of the art, with U(Cg)=0 at the commencement of measuring, entered as U0(Cg) in FIG. 7, only one measuring range can be used, whereas with the circuitry according to the invention the entire charge range d scaled on the ordinate can be covered at the maximum value U1(Cg).

With the aid of the voltage divider 33, 34 it is furthermore possible to select any intermediate value U2(Cg) and with it a reduced measuring range b for the charge Q. For the basic design a value of typically U2(Cg)=2 volts allows a measuring range b for the charge Q of 15 nC. Although the present invention has been described and illustrated in detail, it is to be clearly understood that the same is by way of illustration and example only, and is not to be taken by way of limitation. The spirit and scope of the present invention are to be limited only by the terms of the appended claims.

SUMMARY

In order to extend the measuring range of the known piezotransducer/charge amplifier combination (1) with given capacitance (Cg) of the range capacitor (9) and make it selectable within certain limits, a voltage divider (11, 12) is provided through which the range capacitor (9) and the switching element (10) for zeroing it are led back to the input (7) of the amplifier (5) for the measuring signals.

The switching element (10) for zeroing is controlled by a pulse generator (14, 15) triggered by a switch-on pulse.

With these additions to the known circuitry the range capacitor is charged to a certain quiescent voltage [U(Cg)] at the commencement of measuring, bringing a substantial widening of the measuring range for the charge Q to be measured.

What is claimed is:

1. A circuit for measuring piezoelectric signals including a piezotransducer connected to a first input of a charge amplifier, a range capacitor connected to the first input of the charge amplifier, and a constant voltage source providing a reference voltage to a second input of the charge amplifier, and further comprising:

a voltage divider and a first switching element feeding back an output quiescent voltage of the circuit to the first input of the charge amplifier; and a pulse generator controlling the switching element.

2. A circuit according to claim 1 wherein the voltage divider is shunted by a control element regulated by the charge amplifier.

3. A circuit according to claim 1 including a time constant resistor connected with the range capacitor; and the pulse generator controlling an asymmetrical bistable trigger element.

4. A circuit according to claim 3, wherein the voltage divider is preceded by a shortable resistor whose short-circuiting is controlled by the trigger element.

5. A circuit according to claim 3 including a second switching element bridging the time constant resistor and controlled by the pulse generator.

6. A circuit according to claim 3 wherein the time constant resistor is shunted with an analog integrator or comparator.

7. A circuit according to claim 1 wherein the range capacitor is fed back via a second voltage divider.

8. A circuit according to claim 1 wherein a piezoelectric element of the piezotransducer is in transducer housing insulated against earth.

9. A circuit according to claim 3, wherein the final stage of the trigger element determines the time constant of the circuit.

10. A circuit according to claim 9, including a unidirectional element connected to and preventing self-control of the final state of the trigger element.

11. A circuit according to claim 7, including a low pass filter connecting the piezoelectric transducer to the first input of the charge amplifier.

12. A method of generating a defined quiescent voltage of a circuit including a piezotransducer and range capacitor connected to a first input of a charge amplifier, and a constant voltage source providing a reference voltage to a second input of the charge amplifier, the method comprising:

providing a voltage divider and a first switching element as a feedback of an output quiescent voltage of the circuit to the first input of the charge amplifier; and switching the first switching element on for a defined time interval, with the reset device open, to charge the range capacitor to a defined voltage as a function of the voltage divider and the constant voltage source.

13. A method according to claim 12, including providing a second voltage divider connected to the range capacitor to adjust the range of the range capacitor.

* * * * *